United States Patent Office 3,348,573
Patented Oct. 24, 1967

3,348,573
FLUID PRESSURE REGULATOR HAVING A GUIDED PRESSURE RESPONSIVE MEMBER
Francis H. Bradford, Berkeley, Calif., assignor to Grove Valve and Regulator Company, Oakland, Calif., a corporation of California
Filed Apr. 19, 1965, Ser. No. 449,074
3 Claims. (Cl. 137—505)

ABSTRACT OF THE DISCLOSURE

A fluid pressure regulator wherein downstream pressure acts on a piston opposed by a strong spring. The piston is relatively long but has two short sliding surfaces, one at each end for closer guiding and minimum friction. Preferably, the spring adjusting means extends within the coil with one piston sliding surface guided on it.

Description

Figure 1:
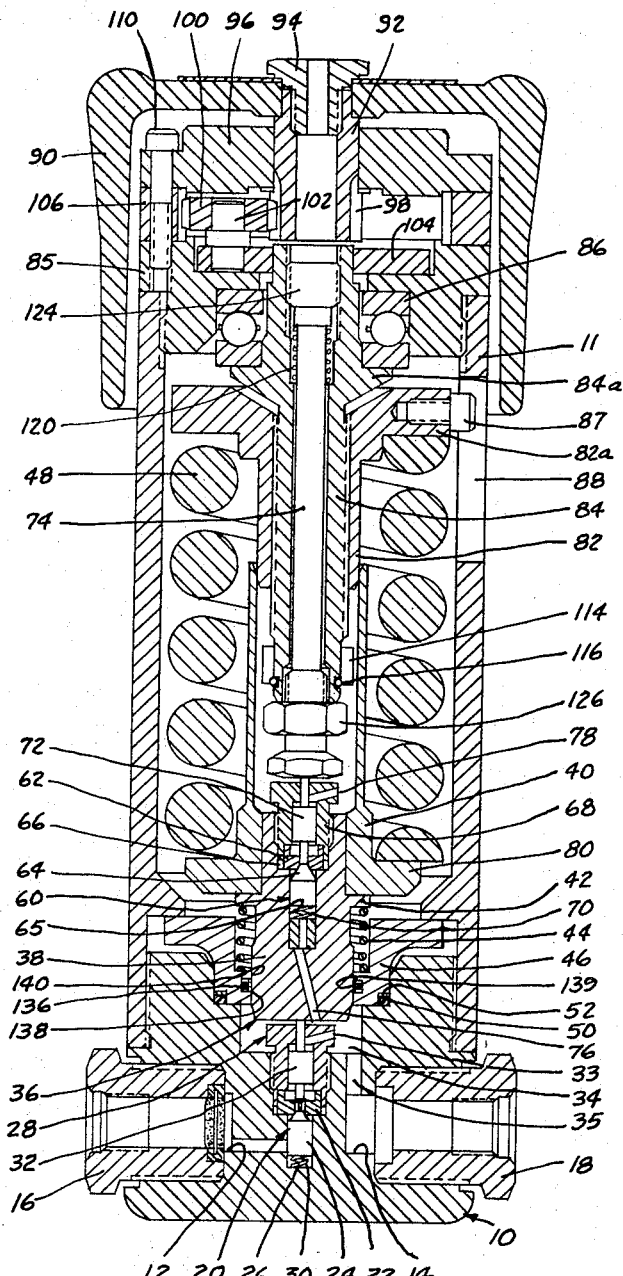

This invention relates to a fluid pressure regulator, and more particularly, to a piston type regulator for delivering fluid at a desired pressure level from a fluid source at a higher pressure.

A typical fluid pressure regulator includes a valve means disposed between a source of fluid pressure and a system to be regulated, which valve is opened to pass fluid in response to operation of a sensing means that indicates a demand. In a piston type regulator, actuation of the valve means is under control of a piston that is slidably movable in a cylinder. One side of the piston may be in communication with the downstream side of the regulator to urge the piston in one direction, and a coiled compression spring or other loading means engages the other side of the piston to urge the same in the other direction. To reduce friction engagement between the piston and cylinder to a minimum, the length of sliding fit therebetween may be minimized. However, misalignment and binding of the piston in the cylinder may occur if only a short length sliding fit is employed.

An object of this invention is the provision of an improved fluid pressure regulator of the piston type.

An object of this invention is the provision of a piston type regulator in which misalignment and binding of the piston is prevented.

An object of this invention is the provision of a piston type regulator, which includes an improved piston construction and guiding means for slidably mounting the same at opposite ends thereof.

These and other objects and advantages of the invention are obtained by a regulator construction employing an elongated piston means slidably supported adjacent opposite ends thereof. Sliding sealing engagement of the piston and cylinder is provided at one end of the piston means, and a sliding fit is provided at the opposite end to guide the piston and prevent misalignment and binding thereof at said one end. With such an arangement a short length sliding engagement at opposite ends of the piston is possible to reduce friction to a minimum. Preferably, the piston means comprises a two piece member which includes a piston member and an attached sleeve member which are movable as a unit. The piston member end of the unit is in sealing engagement with the cylinder whereas the sleeve member end is guided adjacent its free end. A coiled loading spring extends coaxially with the sleeve member, and the sleeve may be situated either inside or outside the coils of the spring to provide for a compact regulator construction.

Figure 2:
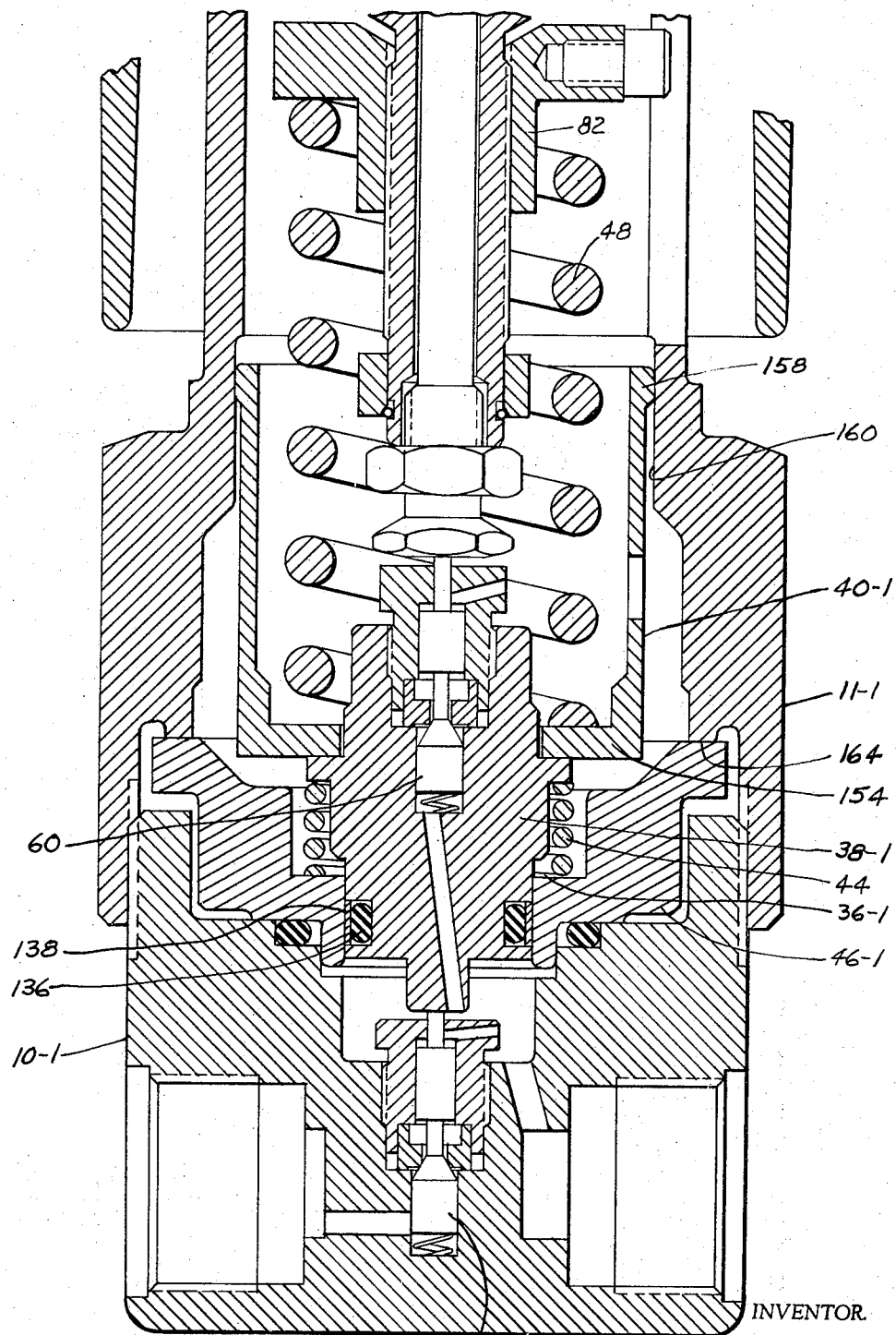

In the drawings wherein like reference characters refer to the same parts in the several views:

FIGURE 1 is a side elevational view in section illustrating a regulating device embodying this invention; and
FIGURE 2 is a view which is similar to FIGURE 1 but showing a fragmentary portion of a regulating device embodying a modified form of this invention.

Referring first to FIGURE 1 the regulator therein shown comprises a body part 10 and a tubular housing 11 threadedly engaged therewith and extending upwardly therefrom. The body part 10 is provided with threaded inlet and outlet ports 12 and 14 into which inlet and outlet port fittings 16 and 18 are threadedly engaged. The inlet fitting 16 is adapted for connection to a source of high pressure fluid such as air or other gas, and the outlet fitting 18 is adapted for connection with a pressure system which is to be maintained at a predetermined pressure lower than the high pressure source.

A valve means 20 is mounted in the body part 10 in a passageway between the inlet and outlet ports, which valve means comprises a stationary seat ring 22 and axially movable valve member 24 loosely disposed in a bore 26 in the body part 10. The seat ring 22 is maintained in position by a threaded seat retainer member 28. A light compression spring 30 at the lower end of the valve member 24 urges the same upwardly toward valve closed position with the seat ring. With the valve means 20 in the open condition fluid from the inlet port 12 may flow through said valve means, past a loosely fitting valve pin 32 in the seat retainer member 28, and through a passage 33 into a chamber 34 formed in the body part. From the chamber 34 fluid passes through a passageway 35 and outlet port 14 in the body to the outlet fitting 18.

The lower end of the valve pin 32 engages the valve member 24 and the upper end thereof extends above the top of the seat retainer member and abuts the bottom surface of a piston means, or plunger, 36. The valve pin 32 thereby serves to transmit axial movement of the piston means 36 to the valve member 24 for controlling the opening of the valve means 20. The piston means 36 and the sliding suport therefor within the regulator are of novel design and are described in greater detail hereinbelow. It will here be noted that the piston means 36 comprises a piston member 38 and an elongated sleeve member 40 which are movable as a unit and could be integrally formed if desired. In the illustrated arrangement the upper end of the piston member 38 extends into the lower end of the sleeve member, with the bottom of the sleeve member abutting a flange 42 formed on the piston member. In the operation of the regulator the piston and sleeve members move together, there being no relative movement therebetween.

The piston means 36 is supported upon a light compression spring 44 extending between the flange 42 on the piston member and a seal retainer ring 46. The spring 44 urges the piston means 36 upwardly and serves to balance the combined weight of the piston means 36 and loading spring 48 to permit setting of the regulator for low output pressures. An O-ring 50 and backup ring 52 in a groove in the retainer ring provide a sealing engagement between the body member 10 and seal retainer ring 46.

The pressure regulator may include a pressure relief valve means 60 which is similar to that shown and described in United States Patent No. 3,068,883 dated Dec. 18, 1962 by Richard S. Brumm and entitled "Regulator." Briefly, the relief valve means comprises a valve seat 62 and a valve member 64 adapted to seat thereon. The relief valve seat 62 is located in a bore 65 in the piston member 38 and is held in position against a shoulder 66 in the bore by a threaded seat retainer member 68. The valve member 64 loosely fits within the bore 65 and is urged upwardly toward valve closed condition against the valve seat by a compression spring 70. The seat retainer member 68 loosely accommodates a valve pin 72 which engages the valve member 64 at the lower end of the pin. The upper end of the pin 72 is adapted to be engaged by the lower end of an adjustably positioned relief valve stem 74 for movement of the valve member 64 from the valve seat 66 under excess regulator outlet pressure conditions. When the pressure relief valve means 60 is opened fluid from the chamber 34 may flow through a passageway 76 in the piston member 38, past the loose fitting valve member 64, through the opened valve means 60, past the loose fitting valve pin 72, and out through a passageway 78 in the retainer ring 68.

As mentioned above, the piston means 36 is spring loaded by the coiled compression spring 48, one end of which spring is seated on a radial flange 80 formed on the sleeve member 40. The other end of the spring 48 is seated upon a spring abutment member 82 of any suitable design. An abutment 82 which is similar to that shown in the above-mentioned Patent No. 3,068,883 may be employed. Such an abutment comprises a flanged stem nut which threadedly engages a stem 84 rotatably mounted in a closure member 85 by means of a thrust bearing 86 carried in the lower end of the closure member. The stem nut 82 is prevented from rotating by means of a guide button 87 attached to the periphery of the flange 82a on the stem nut 82, which button extends into an elongated axially extending slot 88 formed in the housing 11. It will be understood, therefore, that when the stem 84 is rotated the abutment 82 is axially moved therealong to adjust the compression of the spring 48 and hence the spring force on the piston means 36.

Any suitable actuating means may be employed for rotating the stem 84 for axial adjustment of the abutment 82. In the illustrated arrangement a handwheel 90 is provided for this purpose, which handwheel is attached to a shaft 92 by an apertured screw 94. The shaft 92 extends through and is rotatably mounted in a bore in an end cover 96. The inner end of the shaft is provided with gear teeth to form a pinion gear 98 which engages a planet gear 100 rotatably mounted on a pin 102 secured to a drive plate 104. The planet gear, in turn engages a stationary ring gear 106 clamped between the end cover 96 and the closure member 85 which is threadedly secured to the end of the housing 11. Capscrews 110 extend through apertures in the cover 96 and ring gear, and engage tapped holes in the closure member 85 thereby securing the cover and ring gear to the closure member. The drive plate 104 is fixed to the stem 84 whereby rotation of the handwheel 90 functions to rotate the stem 84 through the planetary gearing thereby axially driving the spring abutment 82 along the stem to change the spring loading on the piston means 36. Upward and downward movement of the flanged nut 82 is limited by engagement thereof with a flange 84a on the stem 84 at one end and with a stop collar 114 carried on the stem 84 at the other end. A snap ring 116 in a groove in the stem supports the collar thereon.

The relief valve means 60 as mentioned above is actuated by the valve pin 72 which engages the lower end of the relief valve stem 74. The stem 74 is axially adjustable by means of an adjusting screw 124 in threaded engagement with the stem 84 for changing the pressure at which said relief valve means opens. The lower end of the adjusting screw 124 abuts the upper end of the stem 74, and the screw 124 is accessible for rotation by a suitable wrench through the hollow shaft 92. A compression spring 120 between a shoulder in stem 84 and the set screw 124 provides a loading force on the screw to lock the same against movement upon vibration of the regulator. Also, an adjustable stop member in the form of a nut 126 is provided adjacent the lower end of the relief valve stem 74 which nut is adapted to abut the bottom of the stem 84 thereby limiting the uppermost level of adjustment of the relief valve stem 74 by the adjusting screw 124.

In the operation of the regulating device, the inlet fitting 16 is connected to a high pressure source of fluid and the outlet fitting 18 is connected to a system which is to be maintained at a lower pressure. Under dead end downstream conditions, when fluid pressure is first applied to the regulator inlet, the downstream pressure in the chamber 34 builds up toward the desired pressure and the force on the bottom of the piston member 38 urges the piston upwardly against the force of the loading spring 48 thereby permitting movement of the valve member 24 toward closed condition by the spring 30. When the desired downstream pressure is reached the valve means 20 is closed, and the force on the bottom of the piston member 38 balances the force of the loading spring 48. If for any reason the outlet pressure continues to rise above the desired pressure (e.g., due to leakage of the valve means 20) the piston means 36 with the relief valve means 60 carried thereby are moved further in the upward direction. When the relief valve pin 72 engages the relief valve stem 74, upward movement of the relief valve member 64 is stopped. However, the valve seat 62 moves upwardly with continued upward movement of the piston means thereby opening the relief valve to vent the fluid therethrough. If on the other hand the outlet pressure is reduced for any reason, e.g., by opening of a valve in the downstream system to drain fluid therefrom, the pressure in the chamber 34 is reduced and the piston is urged downwardly by the force of the loading spring 48 to open the valve means 20. Fluid thereby flows through the regulator valve to restore the downstream pressure to that desired. During fluid withdrawal from the downstream system a dynamic balance condition is maintained with the fluid force on one side of the piston balancing the force of the spring 48 at the other side.

The elongated piston means in accordance with this invention, is slidably supported adjacent the opposite ends thereof. A close dimensional sliding fit is provided between the piston member 38 and the ring 46, and sealing engagement therebetween is provided by an O-ring 136 and piston seal ring 138 positioned in a groove 139 in the bore 140 of the retainer ring 46. The seal ring 138 is made of a suitable material, such as "Teflon" which has a small coefficient of friction with the piston member. The O-ring 136 seals in the groove 139 and also biases the "Teflon" seal ring 138 into engagement with the piston member. The length of the cylinder bore 140 along which the piston member 138 slides is preferably made as short as practical to permit maximum misalignment of the piston in the bore without binding. For high pressure use, a close fit between the piston member 38 and bore 140 above the groove 139 is required. Axial alignment of the piston member within the bore 140 is provided by the slide fit between the piston sleeve member 40 and the stem nut 82 adjacent the upper free end of the sleeve member. The interengaging surfaces on the piston sleeve member 40 and stem nut 82 are machine finished for a smooth sliding engagement. A relatively large tolerance sliding fit therebetween is permissible since this guiding surface is spaced a considerable distance from the sliding fit between the piston member 38 and bore 140 at the opposite end of the piston means. Consequently, a relatively large amount of misalignment between the upper and lower guiding surfaces is permitted. Also, by spacing the upper and lower guide surfaces a considerable distance apart, the piston means is stabilized and the sliding friction produced by any eccentric loading of the spring 48 on the piston means is minimized. It will be apparent that if the axial length of the cylinder bore 140 along which the piston member 38 slides is increased, i.e., if the length of the lower guiding surface is increased, a closer tolerance sliding fit between the piston sleeve member 40 and stem nut 82 is required. As mentioned above the length of bore 140 along which the piston member 38 slides is preferably minimized thereby making less critical the fit between the piston sleeve member 40 and stem nut. Misalignment and binding of the piston member 38 within the bore 140 is thereby prevented by this novel arrangement. Also, the use of short length sliding fits at opposite ends of the piston means 36 minimizes friction. Further since the sleeve member 40 is coaxially located within the coiled loading spring 48, no increase in the length of the regulator is required to accommodate the same.

Reference is now made to FIGURE 2 wherein a modified form of regulator which embodies this invention is shown. In the FIGURE 2 arrangement a modified form of piston means designated 36-1 is shown, which includes a piston member 38-1 and attached sleeve 40-1. The sleeve 40-1 is of a larger diameter than the sleeve 40 and has an inwardly directed flange 154 at the lower end thereof which seats on the piston member. The upper end of the sleeve 40-1 is provided with an outwardly extending machined flange 158 which is in sliding engagement with a machined bore 160 in the housing 11-1. The housing 11-1 also differs in construction from the housing 11 (shown in FIGURE 1) in that the inner wall thereof is formed in steps of successively increasing diameter adjacent the lower end thereof, and a shoulder 164 is formed therein against which a seal ring 46-1 is clamped by the body member 10-1. The remainder of the construction is substantially the same as that shown in FIGURE 1 and described above. With this arrangement, as with the FIGURE 1 device, the piston means is guided at opposite ends thereof with a close sliding fit at the piston member. Here, however, the sleeve member 40-1 slides along the inner machined surface 160 of the housing 11-1 rather than on the stem nut 82. The same advantages of this arrangement are realized as with the arrangement of FIGURE 1 and need not here be repeated.

The invention having been described in detail in accordance with the requirements of the patent statutes, various changes and modifications may suggest themselves to those skilled in this art without departing from the spirit and scope of the invention which is defined by the appended claims.

I claim:
1. In a fluid pressure regulating device, a body having fluid chamber means formed therein, inlet and outlet flow passages formed in said body communicating with said fluid chamber,
   valve means located in said inlet passage for controlling the flow of fluid therefrom through the fluid chamber and outlet passage,
   said fluid chamber means having a wall formed therein, a long pressure responsive piston member operatively associated with said valve means and axially slidable in said chamber for actuating said valve means in response to changes in pressure in said chamber and outlet,
   first complementary cylindrical sliding surfaces on said piston member adjacent one end thereof and the wall of said chamber,
   means biasing the piston in a valve opening direction,
   seal ring sealing means between said first complementary sliding surfaces,
   second complementary cylindrical sliding surfaces formed on said piston at the end thereof opposite from and said body remote from said first complementary sliding surfaces, and
   said first and second complementary sliding surfaces being smoothly finished, close-fitting and non-yielding, with their combined axial lengths of engagement being but a fraction of the length of said piston to prevent lateral movement thereof while minimizing friction between said sliding surfaces.

2. The combination defined by claim 1 wherein:
   said sealing means comprises a recess formed around one of said first complementary surfaces,
   a seal ring in said recess, and
   outer portions of low friction material on said ring facing the other of said first complementary surfaces.

3. The combination defined by claim 1 wherein:
   said biasing means comprises a strong large diameter coil spring, and including:
   spring adjusting means mounted in said body including an axially movable member having a portion extending within said coil spring and positioned co-axially to the opposite end of said piston,
   the body one of said second complementary sliding surfaces being formed on said axially movable member, and
   said opposite end of the piston with the other of the second complementary sliding surfaces thereon extending within said spring into cooperative relation with said axially movable member.

References Cited
UNITED STATES PATENTS

| | | | |
|---|---|---|---|
| 510,639 | 12/1893 | Duval | 137—116.5 |
| 672,787 | 4/1901 | Lewis | 137—505.25 |
| 2,877,071 | 3/1959 | Arnot | 277—176 X |
| 2,968,501 | 1/1961 | Tisch | 277—177 |
| 3,032,061 | 5/1962 | Silver | 137—116.5 X |
| 3,068,883 | 12/1962 | Brumm | 137—116.5 |

WILLIAM F. O'DEA, *Primary Examiner.*
HAROLD W. WEAKLEY, *Examiner.*